Dec. 31, 1957 A. W. WHITE 2,818,135
DUST LADEN AIR SEPARATOR
Filed Aug. 16, 1954 3 Sheets-Sheet 1

INVENTOR.
A. W. White
BY
C. M. McKnight
ATTORNEY

Dec. 31, 1957      A. W. WHITE      2,818,135
DUST LADEN AIR SEPARATOR

Filed Aug. 16, 1954      3 Sheets-Sheet 2

INVENTOR.
A. W. White
BY
ATTORNEY

Dec. 31, 1957  A. W. WHITE  2,818,135
DUST LADEN AIR SEPARATOR

Filed Aug. 16, 1954  3 Sheets-Sheet 3

INVENTOR.
A. W. White
BY
ATTORNEY 2,818,135

DUST LADEN AIR SEPARATOR

Arthur W. White, Oklahoma City, Okla.

Application August 16, 1954, Serial No. 449,981

1 Claim. (Cl. 183—26)

This invention relates to an air filtering apparatus for removing dust particles, smoke particles or any other type of pulverized solid debris from air or gas that is exhausted in various manufacturing processes.

It is often desirable to filter dust laden air, smoke laden air, or the like, as well as to eliminate an obnoxious condition resulting from exhaust fumes of many manufacturing processes, particularly in asphaltic concrete mixing, sewage disposal plants, and other similar types of operations where dust and fume laden gases are a detriment. The present invention contemplates a means of filtering and washing obnoxious exhaust fumes in a novel manner with a resultant release of clean, conditioned air, thus eliminating a disadvantage in many present day manufacturing processes. In industries such as gravel and sand plants, sewage disposals, lead and zinc smelters, carbon black plants and the like, where small pulverized particles are present in the smoke and dust discharged from the plant, they are injurious and detrimental to the health and safety of the citizens in the surrounding communities due to the dust and stench, and as a consequence, most manufacturing of this type is located in obscure places because of this detriment.

This invention is generally concerned with a filter or separator utilizing a plurality of corrugated baffles to effect a scrubbing action of the debris laden air mixed with an absorbent liquid and agitated to cause a turbulent, boiling action of the emulsion in order to free the undesirable particles from the gases, thus leaving the discharging gases clean and substantially free from foreign content.

It is an important object of this invention to provide an air separator for filtering debris or like particles from air or similar gases.

It is another object of this invention to provide a dust filter for separating particles of debris from gases through mixing with a liquid and agitating to provide a resulting exhaust of conditioned air substantially free of stenches and solid materials, or obnoxious contents.

It is a further object of this invention to provide a dust filter for cleansing dust laden air adapted to be mixed with a liquid for scrubbing of the emulsion, thus facilitating the separation of the dust particles therefrom, and said scrubbing action effecting a turbulence on the surface of the cleansing liquid to create an efficient adsorbing action.

A still further object of this invention is to provide a dust filter utilizing an inlet pipe cooperating with spreading pipes so arranged to provide an efficient source of supply of cleansing liquid to the dust laden air.

It is also an object of this invention to provide a separating tank for filtering dust and other impurities from gases wherein the gases are mixed with a liquid in a manner to create an extreme turbulent condition and the mixture is then directed through a continuous tortuous path to effect a scrubbing action of the mixture for breaking up and releasing any impurities within the gases.

And still another object of this invention is the separation of impure dust and other debris from air and the like by submitting it to a boiling turbulence mixed with liquid, or the like, and the mixture is caused to travel in a tortuous path against corrugated baffles to assure a breaking up of heavier particles in the air during upward travel and prevent any possibility of rearward travel of the turbulent uprising air.

Other objects and advantages of the invention will be evident from the following detailed description, read in conjunction with the accompanying drawings, which illustrate my invention.

In the drawings:

Figure 4 is a perspective view of a portion of the inlet pipe and a connecting spreader pipe.

Figure 1:
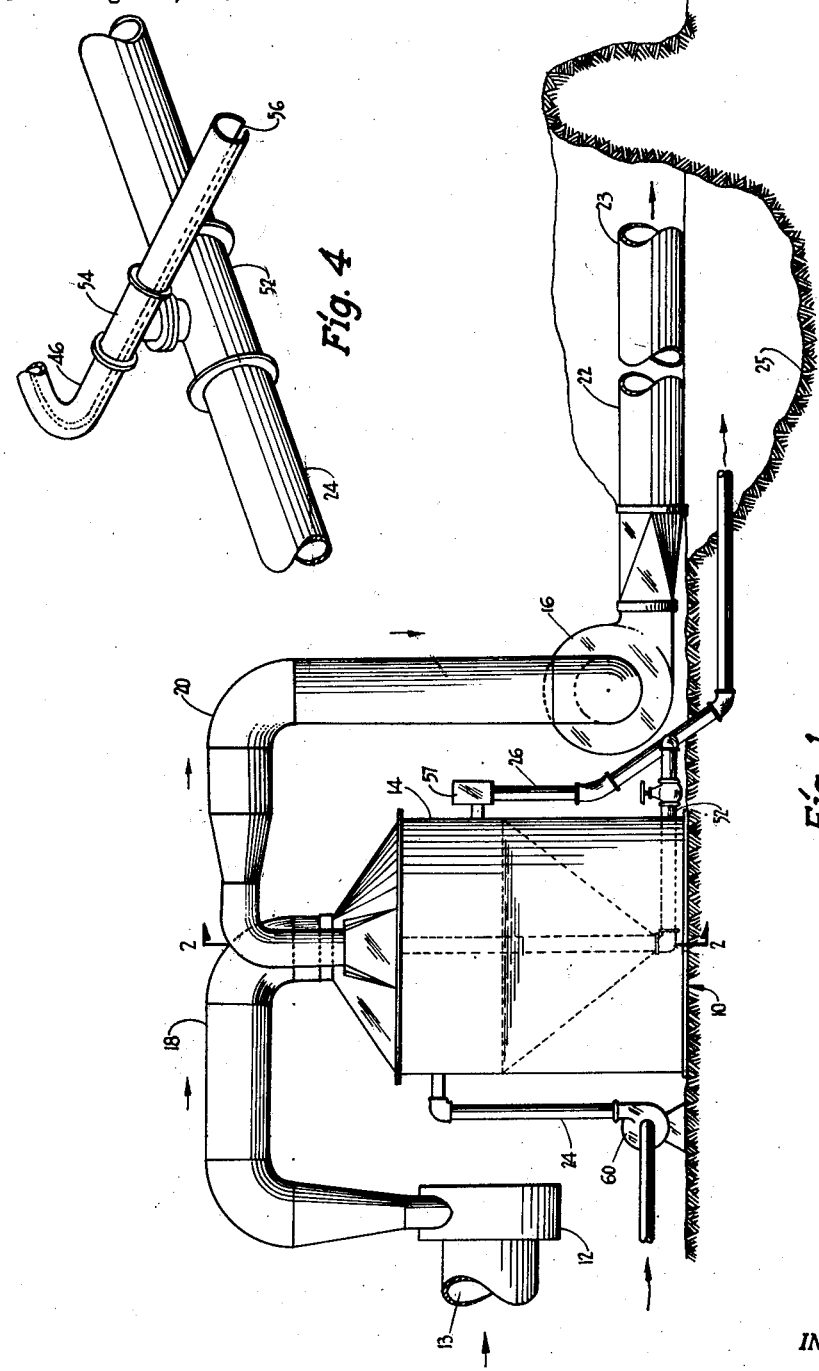
Figure 1 is a side elevational view of a filtering system embodying the invention.

Referring to the drawings in detail, reference character 10 represents a filtering system in general, comprising a discharge end 12 of a conduit 13 of a drier or the like (not shown), and a filtering tank 14 connecting with a suction pump 16. The discharge end 12 is connected to the filtering tank 14 by any suitable ducting means 18, and the filtering tank is in turn connected to the suction pump 16 by similar conduits 20. An outlet pipe 22 of the suction pump 16 discharges the filtered air into the atmosphere as shown by the arrow at 23 and into a sump 25 preferably located in proximity of the pipe 22. A cleansing liquid, such as water or oil, but not limited thereto, is directed to the filtering tank 14 through an inlet pipe 24, and is discharged from the tank by means of a discharge pipe 26 into the sump 25 to be re-circulated into the filter tank in a manner as will hereinafter be set forth.

Figure 2:
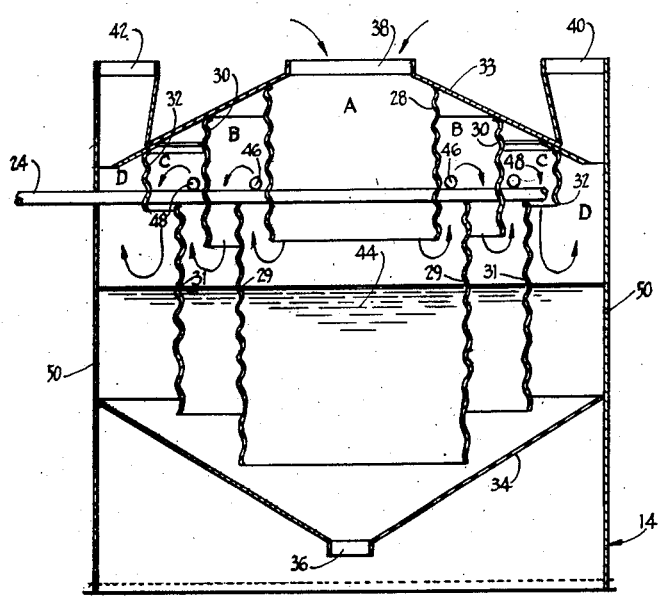
Figure 2 is a sectional elevational view taken along line 2—2 of Fig. 1 depicting the arrangement of the baffles and the course of the air being filtered therein.

Referring more particularly to Fig. 2, the vertical tank 14 is preferably of cylindrical shape and is provided with upper circular baffles 28, 30 and 32 secured to and extending downwardly from a top member 33. The cover or top 33 is substantially conical shaped, but not limited thereto. Additional baffles 29 and 31 are provided within the tank 14 and are interposed between the baffles 28, 30 and 32. The baffles 29 and 31 extend upwardly to a position above the bottom of the upper baffles 28, 30 and 32, thereby forming a continuous passageway to communicate the air coming into the tank through an inlet port 38 to outlet ports 40 and 42. The baffles 29 and 31 are secured in suspended relation from baffles 28, 30 and 32 in the arrangement shown in Fig. 2 by a plurality of circumferentially spaced horizontally disposed rods (not shown) interconnecting between the baffles in order to position the interposed baffles 29 and 31 as shown. The baffles are preferably made of corrugated metal, but not limited thereto, and are substantially of circular configuration disposed in spaced relation to each other to form chambers or annuluses A, B, C and D for a purpose as will hereinafter be set forth.

A conical shaped drain member 34 is disposed in the lower portion of the separator tank 14, and is provided with an aperture 36 for discharging filtered residue therefrom. The dust laden air is expelled from conduit 18 into centrally disposed inlet aperture or port 38 and is directed vertically downward into the chamber A of the tank 14. The air after separation is discharged from the tank through outlets 40 and 42 provided at the top of the tank 14 for conducting the cleansed air into the ducts 20 adjacent the outlets 40 and 42 and therefrom to be discharged into the sump 25.

*Operation*

In operation, the air or gas to be filtered is usually discharged from the duct 18 into the inlet 38 and chamber A at a high rate of speed having considerable force and velocity thereby churning heavily, providing considerable turbulence. The inrushing air impinges against the inner wall of the corrugated baffle 28 causing a turbulent vertically downward scrubbing action of the air itself, thereby tending to separate the pulverized dust and other particles contained therein. The force of the air striking the cleaning fluid 44 disposed in the bottom of the tank 14 mixes therewith and causes a churning, turbulent boiling action of the emulsified fluid 44 effecting a partial cleaning of the air. The turbulent action of the incoming air mixing with the normally stationary liquid in the tank in cooperation with the suction from the pump 16 will direct the agitated emulsion vertically upward between the corrugated baffles 28 and 29 and into the chamber B.

As the mixture is directed along the corrugations of the baffles 28 and 29, it is scrubbed to break up and release the dust or heavier particles from the air or gases which are permitted to fall back into the liquid body 44. The breaking up of the emulsion is assisted through a constant stream of water discharging from a circular spreader pipe 46 downwardly against the uprising mixture. The spreader pipe 46 is arranged for circular disposition and connected to the water inlet pipe 24 in a manner as will be hereinafter set forth. A similar spreader pipe 48 cooperates with the pipe 24 for a like purpose.

As the turbulent mixture is directed and spills over the top of the corrugated baffle 29 into the chamber B, it is further scrubbed through contact with one side of the corrugated baffles 29 and 30. The force of the agitation and the suction pulls the mixture into the chamber C with a continuous scrubbing action against baffles 30, 31 and 32. The spreader pipe 48 is disposed in chamber C for the supply of additional water assisting in the breaking up of the heavier laden impurities in the air simultaneous with the scrubbing action. It will be apparent that the turbulent action at this stage of the scrubbing action will be less than in chamber B, however, the force is sufficient for the emulsion to continue through the tortuous scrubbing path, and it is directed over the baffle 32 into an outlet chamber D in communication with the outlets 40 and 42. The arrangement of the plurality of circular baffles provides for the scrubbing action of the mixture throughout the tank 14, however, in the last stage of the scrubbing action in chamber D, it is directed from chamber D into the diametrically opposed outlet conduits 40 and 42. In this condition, the mixture has been completely scrubbed and the air substantially free of any impurities has been separated from the liquid and is permitted to discharge through the outlets 40 and 42 in a substantially clean and non-odorous condition into the sump 25.

The agitation of the liquid 44 and subsequent mixing with the incoming air creates sufficient turbulence to assure a thorough and efficient washing of the air that will cause the debris and other particles therein to be separated so that after separation the debris will fall by gravity with the liquid continuously during the scrubbing action. The continuous tortuous path of the scrubbing action vertically both upward and downward along the corrugated baffles assures a more efficient breaking up and de-emulsification of the mixture with an efficient cleansing and freeing of dust and other impure articles from the air itself.

Figure 5:
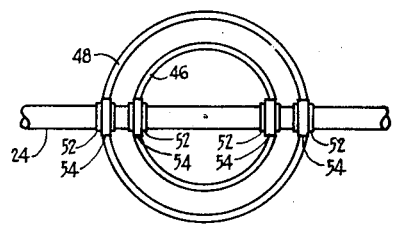
Figure 5 is a top view of the piping arrangement with the baffles eliminated for clarity.

The additional water sprayed through the inlet pipe 24 cooperates with the circular spreader pipes (Fig. 5) through any suitable T-connections 52, such as that shown in Fig. 4. The T-connections 52 in turn cooperate with a T-connection 54 perpendicularly arranged relative thereto, and into which are secured the spreader pipes 46 and 48. It will be apparent that the pipes 46 and 48 may be disposed above the inlet pipe 24 as shown in Fig. 4 or secured in a similar manner below (not shown) the inlet pipe 24 as desired. Each of the circular spreader pipes 46 and 48 is provided with a slotted portion 56 substantially throughout in order to discharge the water downward into the tank 14.

The desired fluid level in the tank is attained by means of any suitable control valve or outlet 57. The fluid is carried from the tank 14 through pipe 26 to the sludge pit 25 wherein the water may be re-circulated through pump 60 and line 24 back into the tank 14, if desired.

It will be apparent from the foregoing that the disposition of the outlets 40 and 42 will be determined by the conditions under which it is desired to use the filtering system. In applications requiring moisture-free air, the outlets 40 and 42 will be more efficient if they are high above the surface of the liquid 44, such as herein depicted. Heavily laden air, such as from asphaltic manufacturing processes, requires moisture in the released air. This is effected by locating the outlets 40 and 42 in closer proximity to the liquid level in the tank 14, and by regulating the height of the liquid level by any suitable means, such as a float valve (not shown). The smaller the distance between the liquid surface and the bottom of the upper baffles 28, 30 and 32, the more moisture will be carried over into the discharge outlets and, similarly, the greater the distance between the bottom of the upper baffles and the surface of the liquid, the less moisture will be carried into the outlets.

Figure 3:
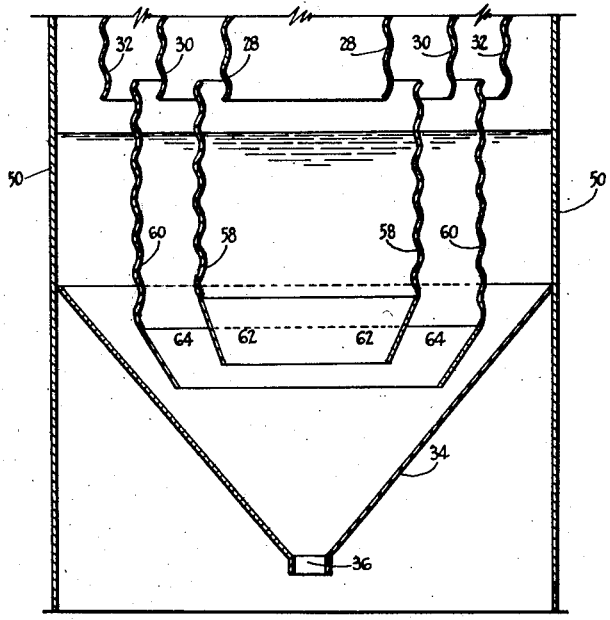
Figure 3 is a portion of a sectional elevational view of a filter tank embodying the invention and depicting a modified baffle arrangement.

In Fig. 3 is shown a modification of the invention utilizing a filter tank having modified lower baffles 58 and 60 which may be desired when the filter is to be used under such conditions as required by a diesel engine or the like where the necessity for re-circulating the cleaning fluid is at a minimum. In such instances, it is normally found to be necessary to clean the tank only at frequent intervals thereby eliminating the necessity of a constant supply of cleaning fluid, such as in the preferred embodiment. The lower portion of corrugated baffles 58 and 60 are bent at an angle to form conical shaped walls 62 and 64, respectively, preferably of smooth surface, and assist in directing the collected debris into the conical collector 34. The aperture 36 cooperating with a discharge line (not shown) serves as an outlet for draining the fluid and debris from the tank, and the tank may be refilled through the top or at the side as convenience dictates. An efficient cleaning of air in a filter tank utilizing the modified baffles 58 and 60 is accomplished by the force of the air as it enters the tank, in the same manner as in the preferred embodiment, causing a turbulence of the air and water. The air is drawn toward the outlet in a manner similar to that hereinbefore described without the stream of water from the spreader pipes impeding its progress.

Figure 6:
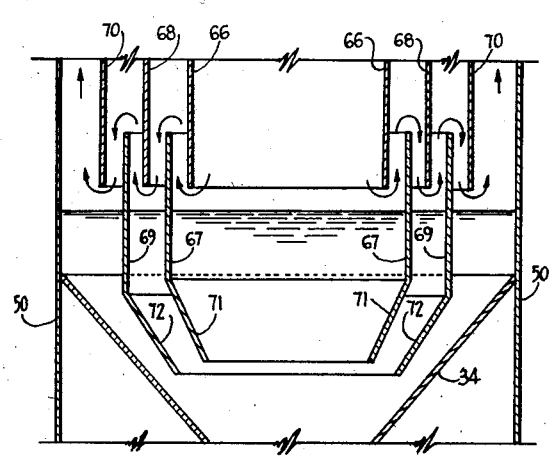
Figure 6 is a partial sectional elevational view of a filter tank embodying a modified form of the invention.

It is found in many applications of this nature that the agitation of the air and liquid need not be so violent. In such a case, a modified filter tank (Fig. 6) embodying straight non-corrugated upper baffles 66, 68 and 70 and straight lower baffles 67 and 69 with their lower portions terminating in conical shaped sections 71 and 72, respectively, will provide a lesser agitation of the air and liquid as the air is pulled along its course through the filter tank as indicated by the arrows (Fig. 6). The movement of the air and the mixture with the cleaning liquid is substantially the same as that in the preferred embodiment.

Figure 7:
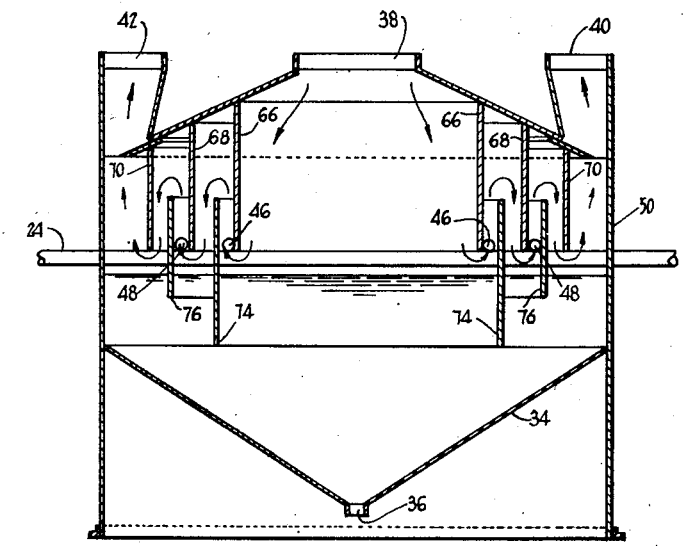
Figure 7 is a sectional elevational view of a filter tank embodying a further modification of the invention.

It will be apparent from the foregoing that a modified filter tank (Fig. 7) provided with straight upper baffles 66, 68 and 70 and straight lower baffles 74 and 76 will cooperate with the inlet pipe 24 and spreader pipes 46 and 48 to clean the air passing through the system in a manner as hereinbefore described in the preferred embodiment, but with a slower agitation.

From the foregoing, it will be apparent that the present invention provides a cleansing or filtering apparatus adapted to be utilized in conjunction with various types of manufacture from which dust laden, odorous and contaminated air or gases are emitted, and which it is very desirable to cleanse in order to eliminate the detrimental particles and debris therefrom. The cleansing apparatus receives the emitted contaminated fluid in a manner that the force and velocity of the fluids are subjected to a washing or cleansing liquid disposed in a separator tank so that a turbulence or agitation is created between the incoming dust laden fluids and the normally stable cleansing liquid. The mixture of the contaminated gases and the cleansing liquid is directed in a continuous reverse vertical direction, or reciprocal path within the tank and against the walls of the corrugated baffle members disposed therein in order to provide a tortuous flow against the baffles and effect an efficient washing or scrubbing of the mixture so that dust particles or other debris in the mixture will adsorb with the cleansing liquid and continuously fall by gravity therewith, and at the end of the scrubbing operation, thereby providing a washed, purified or conditioned air which is discharged into the atmosphere substantially free of contaminates.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In a fluid separating apparatus for cleansing contaminated and odorous fluids comprising a vertically disposed cylindrical tank having a cleansing liquid disposed in the lower portion thereof, a conical shaped cover provided for the tank, a centrally disposed inlet provided in the cover for discharging the contaminated air into the tank in a downward direction into contact with the cleansing liquid therein to create a boiling undulated mixture, a plurality of corrugated cylindrical shaped concentrically spaced baffles extending downwardly from the inner periphery of the cover and terminating above the cleansing liquid, a plurality of concentrically spaced upwardly extending corrugated baffles interposed between said downwardly extending baffles and terminating below the surface of the cleansing liquid, said baffles directing the turbulent mixture in a reverse vertical path through the baffles for scrubbing the mixture against the corrugations thereof, an inlet pipe extending transversely through the downwardly extending baffles, a plurality of circular spray pipes supported by the inlet pipe and disposed between the concentrically spaced baffles and arranged to project circular sprays downwardly between the lower ends of the downwardly extending baffles and the upper ends of the adjacent upwardly extending baffles and spraying cleansing liquid during the scrubbing action, and drain means disposed in the tank below the baffles.

References Cited in the file of this patent

UNITED STATES PATENTS

| 886,009 | Moyer | Apr. 28, 1908 |
| 1,050,866 | Snow | Jan. 21, 1913 |
| 1,069,335 | Johnson | Aug. 5, 1913 |
| 1,793,620 | Jacobus | Feb. 24, 1931 |

FOREIGN PATENTS

| 12,007 | Great Britain | May 21, 1912 |
| 14,806 | Great Britain | Oct. 20, 1915 |